June 22, 1954  E. D. LAMBERT  2,681,719
SPRING CONNECTING AND ANCHORAGE MEANS
Filed Dec. 24, 1949  2 Sheets-Sheet 1
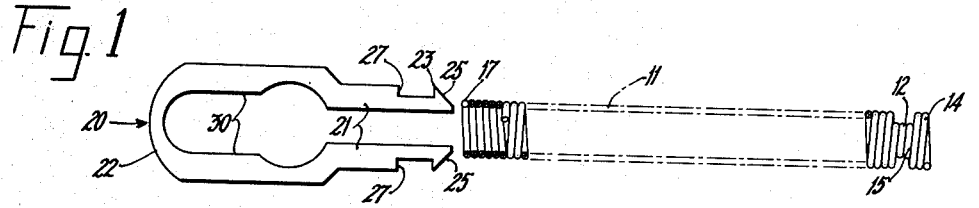
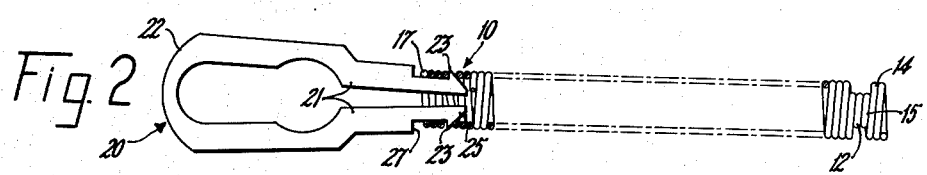
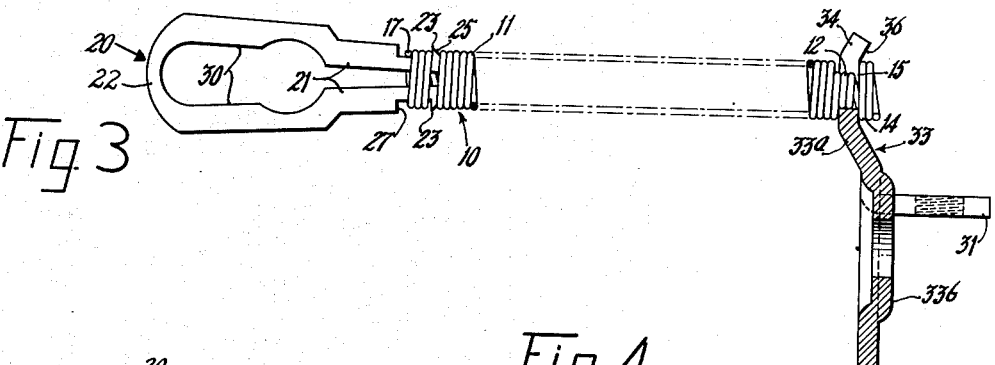
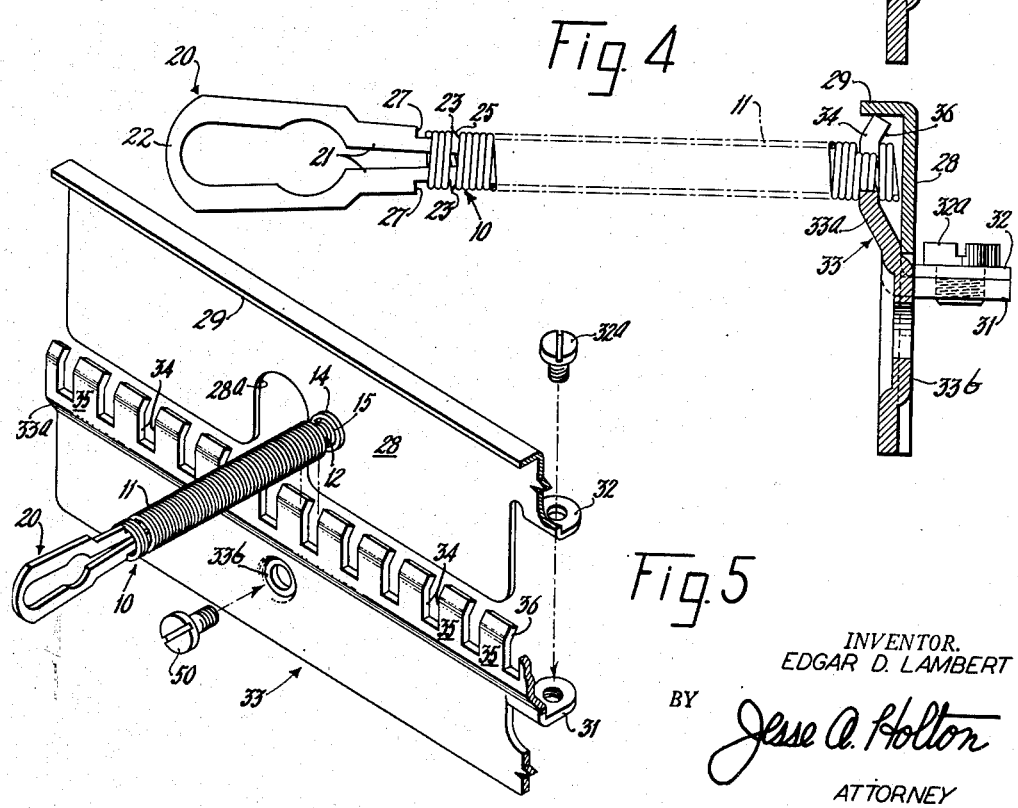
INVENTOR.
EDGAR D. LAMBERT
BY Jesse A. Holton
ATTORNEY June 22, 1954  E. D. LAMBERT  2,681,719
SPRING CONNECTING AND ANCHORAGE MEANS
Filed Dec. 24, 1949  2 Sheets-Sheet 2
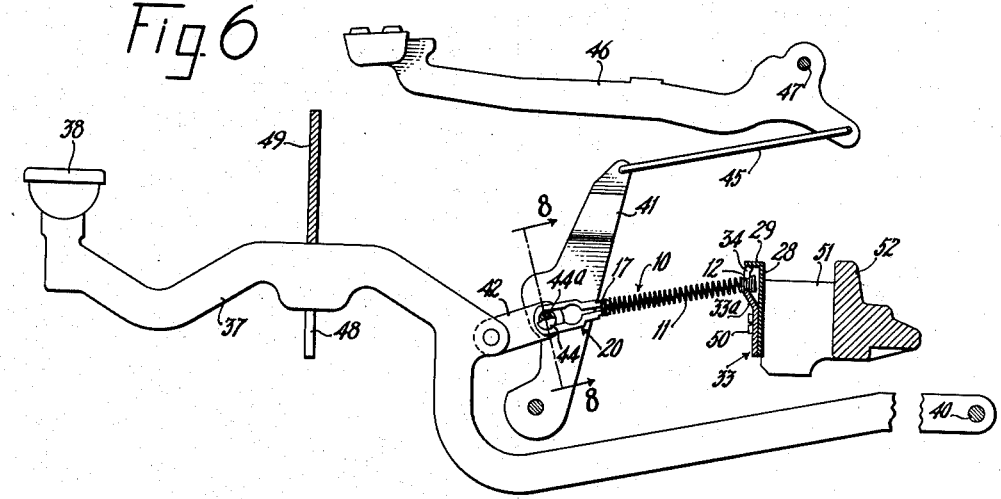
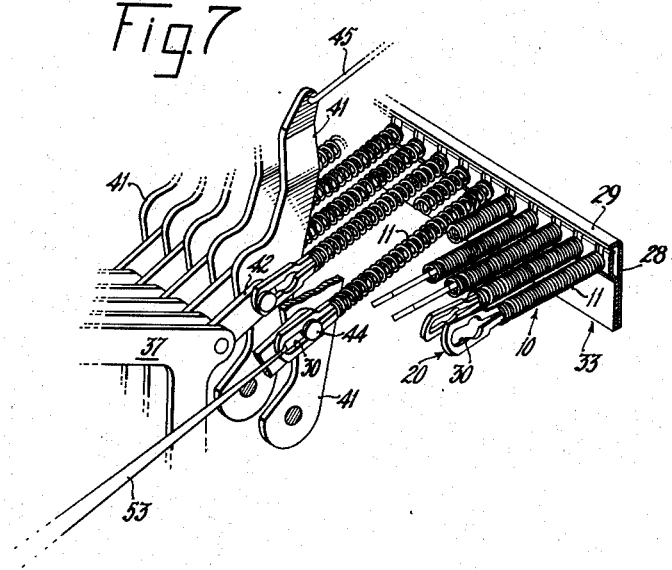
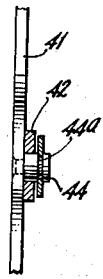
INVENTOR.
EDGAR D. LAMBERT
BY
*Jesse A. Holton*
ATTORNEY

Patented June 22, 1954

2,681,719

UNITED STATES PATENT OFFICE 2,681,719

SPRING CONNECTING AND ANCHORAGE MEANS

Edgar D. Lambert, West Hartford, Conn., assignor to Underwood Corporation, New York, N. Y., a corporation of Delaware Application December 24, 1949, Serial No. 134,950

10 Claims. (Cl. 197—33)

This invention in general relates to coil springs and anchorage or attaching means therefor, and particularly to provision of low-cost coil spring units and means for their assembly efficiently in machines, reducing the over-all production cost of machines appreciably.

In typewriting and other machines having a multiplicity of similar, closely grouped parts individually under tension of springs, such springs are usually hooked adjacently, in a row, to an anchorage member, and the spring ends extending from said anchorage member are provided with hooks for attachment to movable machine elements. Usually the springs are first attached one by one to the anchorage member before assembly of the latter in the machine, and then after assembly of the anchorage member in the machine, the free hook-ends of the springs are hooked, one after another, to the various movable machine elements. This stated manner of installing springs is extremely time-consuming, and thus costly, inasmuch as each individual spring must be carefully hooked to the anchorage member, and since when so attached or hooked they extend in an unorderly manner at all angles from said anchorage member, leaving the free hook-ends in confused order, wherefore then meticulous care must be exercised on the part of the assembler to join the proper springs to the proper moving parts or elements. The difficulty is aggravated further by the tendency of the hook-ends of the springs to become entangled and interlocked with each other. For the reason stated, the installation of springs in typewriters, adding machines and the like has been very expensive.

The spring coils generally used in typewriting and machines of similar complexity are usually formed at each opposite end with a hook or loop through bending of the spring wire, such hook extending in a plane lengthwise of the spring. However, it has been known to form attaching or anchorage ends for spring coils from separate elements, for example sheet metal stampings of the type disclosed in the patent to Sundstrand, No. 1,664,647, dated April 3, 1928. However, the known separate anchorage elements have been found too costly to assemble on the spring coils and therefore have never found wide application. This particularly has been the case in connection with very light springs where the attachment of the separate element to the spring coil entailed more care and labor, and thus expense, than the forming of hook-ends integrally on the springs.

The present invention successfully deals with the problem of providing low-cost coil spring units, and also successfully deals with the problem of installation of springs, at low cost, efficiently in machines, and particularly where numerous springs are required to be installed in closely adjacent relation.

One object of the invention is to provide an economically manufacturable coil spring.

Another object is to provide a coil-spring which at least at one end carries an efficient, low-cost element which is associable therewith with great convenience and facility, and provides a ready means to attach operatively the spring coil to a machine element.

It is another object of the invention to provide the element of the preceding paragraph in a form so that after attachment to the spring coil in a longitudinal relation therewith it is not liable to lose such relation.

It is a further object to provide efficient, low-cost anchorage means for a gang of springs such as require closely adjacent accommodation in a machine, such anchorage means supporting the springs efficiently in erect, orderly, non-entangling relations.

It is also an object to attain the last-noted object by a structure which allows quick, efficient and convenient assembly of the springs on the anchorage means.

A still further object of the invention is to provide a low-cost sub-assembly unit consisting of a gang of adjacent springs on an anchorage bar or element, efficiently attachable to such bar to stand erect therefrom in orderly adjacent relations, so that when the unit is mounted in the machine, the projecting ends of the springs are readily and efficiently connectable in proper order to related machine members, without any chance of confusion.

Another object of the invention is to reduce the cost of installation of springs associated with a system of type actions in a typewriter.

Other objects and features of the invention will be apparent from the drawings and from the description which follows.

Having reference now to the drawings:

Figure 1 illustrates a spring coil and an attaching element associable with an end of the said spring coil, the other end of the spring coil having turns providing an anchorage formation, Figure 2 shows the stated element of Figure 1 assembled with the spring coil to form a complete single spring assembly, Figure 3 shows the spring of Figure 2 attached by its anchorage formation to an anchorage bar or member, Figure 4 is a view similar to Figure 3 and shows in association with the anchorage member a plate to retain one or more of the spring units attached to the anchorage member, Figure 5 is an exploded perspective view showing the anchorage member of Figures 3 and 4, the associated retainer plate, and one of the novel spring units of Figure 2 ready for assembly on the anchorage member, Figure 6 shows a typewriter type action in side elevation, together with the novel spring and spring anchorage means, Figure 7 is a front perspective view illustrating fragments of several type actions, and associated therewith the novel spring and spring anchorage features, Finally, Figure 8 is a front sectional view along along lines 8—8 of Figure 6, showing a separable pivotal joint of the type action and the spring of the invention keeping the joint from separating.

An assembled spring 10 shown in Figure 2 comprises a contractile, generally cylindrically wound coil 11 of spring wire having near one end a circumferential groove or neck 12 formed by a few small diameter wire turns intermediate larger-diameter wire turns. It will be noted that the end of the spring due to the provision of the neck takes a knob-like form 14 and that this knob affords a spring anchorage shoulder 15.

Opposite to the knob-end 14 the spring coil 11 is substantially cylindrical in form and ends abruptly, see Figure 1. For attachment to a machine part, in a manner to be later brought out, the coil end 17 carries a terminal element or clip 20 which is efficiently associable therewith. Said element 20 may consist of a flat sheet metal stamping of light gauge material, for example stainless sheet steel, and comprises two substantially parallel opposite legs 21 joined by a connecting, preferably flexible bridge 22, each leg 21 having near its extremity at least one tooth or barb 23 pointing outwardly for entering or biting between the turns of the spring coil. The said terminal clip or element 20 is readily attachable to the interior of the coil end 17 by merely pushing it, free ends of the legs 21 leading into the coil as shown in Figure 2. Before assembly on the coil end 17, the legs 21 have a spread as illustrated in Figure 1, and the opposite spurs or teeth 23 have a separation considerably wider than the outside diameter of the coil end 17. The extremities of the legs form tapering continuations of the teeth 23 as at 25 and the inner ends of such tapering continuations have a lesser separation than the interior of the coil end 17. The said tapering continuations extend from the teeth 23 toward each other in a direction away from the bridge 22 and into closer relation than the edges on the legs 21 facing outwardly intermediate the teeth 23 and the shoulders 27. The legs 21 are capable of being flexed toward each other and it follows thus that the element 20 is attachable to the interior of the coil by merely pushing it endwise thereinto as illustrated in Figure 2, the tapers 25 by engagement with the end of the spring coil being effective to flex the legs toward each other. Upon so pushing the element 20 into the coil end 17 the inherent tension across the bridge 22 of the element, as also in the legs themselves, is instrumental to spread the legs 21, the barbs or teeth 23 biting between the spring turns for a firm hold therein. A shoulder 27 on each one of the legs situated nearer to the bridge than the tooth 23 and facing toward such tooth, is adapted to contact squarely with the end turn of the spring coil, to limit the introductory movement of the terminal clip or member 20. Said teeth or barbs 23 are preferably of saw-tooth form as shown, on the one hand to glide easily into the end of the coil, and on the other hand to provide a firm interlock with the spring coils when a pull is exerted on said clip. It will be noted that the pointed teeth 23 point outwardly from the element on a bias toward the bridge-end of the element. For attachment to a machine part the space between the legs adjacent to the bridge 22 is widened into keyhole form as at 30 to afford an attaching loop or bight as shown, but more will be said in regard to this at a later point of this description.

In typewriting, adding and other relatively complex machines it is common to have a gang of coil springs of which the individual springs are arranged alongside of each other in closely neighboring relations. Such springs are usually hooked to a common anchorage member. The common practice has been to hook first all springs into holes on an anchorage member before assembly of the latter in the machine, then to install such anchorage member with the springs loosely hanging therefrom in the machine, and further thereafter to connect the loose ends of the individual springs with operating parts in the machine. The loosely hanging springs became entangled, and mixed up in their order, wherefor connection of the free ends of the springs to proper machine parts entailed great difficulties.

The spring coils 11 of the invention, in distinction from the prior art practice, are adapted for anchorage to an anchorage member 33 in orderly and efficient fashion. Towards the stated end, see Figures 3 to 7, inclusive, an anchorage member 33 is provided which may consist of an elongate sheet metal plate and which has transverse notches 34 along one edge thereof. These notches 34 are of a width to accommodate the spring coils 11 by their annular grooves or necks 12, the latter being insertable in said notches 34 transversely of the longitudinal axes of the spring coils. The spring coils, at the general location of the necks 12 are preferably proportioned relatively to the anchorage member at the notches 34 so that each becomes resiliently clasped in erect relation to the bar or member 33. The various spring coils 11 clasped onto the anchorage member 33 extend therefrom in orderly neighboring relations even before attachment of their free ends to machine elements. The extending free ends of the springs are thus not liable of entanglement with each other. Liability of entanglement is further overcome because the terminal elements 20 of the springs have no catching or loose ends, that is, they do not have the conventional hook-ends which are normally formed by the spring wire itself. For the stated clasping association of the necked spring ends with the anchorage member 33, said necks 12 may be of slightly larger diameter than the width of the anchorage member notches 34, or they may be slightly shorter than the thickness of the anchorage member 33 at the notches. Note that the spring-neck in Figures 3 and 4 is slightly distended in comparison with the neck shown in Figures 1 and 2, and that therefore the large spring turns adjoining the neck exert a clasping hold on the anchorage plate 33. The spring coils are attached into anchorage locations on the plate 33 by forcing the necks 12 thereof transversely of their expanse into the open ends of the notches. If desirable, the spring at the neck portion may be of a form to derive its clasping hold from both the stated conditions. It will be noted from Figure 5, that the teeth or tabs 35 formed intermediate the notches 34 are bent at their outer ends, as at 36, slightly out of the plane in which the main portions of said tabs lie, whereby the spring necks 12 require some stretching to introduce them into the notches 34 past the ends of the teeth. Obviously the portions of the teeth 35 which project out of the general plane of the plate 33 afford a means to keep the spring coils 11 at their necked ends from slipping out of the notches 34.

For holding all springs 10 permanently assembled in the notches 34 of the anchorage member 33, there is provided a retainer plate 28 having a top ledge 29 to overlie and thus close up all said notches. Said anchorage member or plate 33 has at spaced points ears 31 bent rearwardly therefrom, and to these ears the retainer plate 28 is attachable, the latter having rearwardly bent ears 32 to overlie the ears 31, and screws 32a being provided to fasten the ears 32 upon the ears 31. To provide space for the knoblike heads 14 of the springs in front of the retainer plate 28, the said anchorage plate is formed with an offset below the knobs 14, as at 33a, which offset also lends rigidity to the anchorage member. The multiplicity of spring coils 11 in assembled condition on the anchorage plate 33 preferably constitute with the latter an assembly unit for installment in a machine by securing the anchorage member or plate 33 in a machine. The spring coils 11 of such unit need not necessarily include the clips 20 at the extending ends, inasmuch as such ends may have the conventional hooks formed directly from the spring wire, or may have other attaching means.

It is to be noted that the attaching clips or elements 20 after introduction in the coil end 17 stand substantially straight in line with the associated spring coils. This is due to the outward pressure which the legs 21 exert, straight portions or edges of said legs between the burs 23 and the shoulders 27 bearing internally with pressure against the spring turns.

Referring now specifically to Figure 6, there is shown in side elevation a central type action of a conventional typewriter, the illustrated type action, as well as many other actions adjacent thereto, comprising each a key lever 37 having a key button 38 at one end, and all such levers at the other end being pivoted on a rod 40. Each key lever 37 is operatively connected with its related upstanding lever 41 by means of a short link 42, the latter having at the front a pivotal connection with the lever 37 and being at the rear pivotally connected to a short pin 44 that projects sidewise from the lever 41. The upper end of each lever 41, by means of a link 45, is connected to an associated type bar 46, the latter forming an arcuate array and all being pivoted on a usual arcuate rod 47. Near the forward ends the key levers 37 are guided in individual vertical slots provided in a comb plate 49, and bear normally against the top limits provided by such slots. The various key levers 37 and the parts 41, 42, 45 and 46 constituting the individual type actions are restored each by its own assembled spring 10, all said springs 10 being anchored on the anchorage member 33, and the latter being fastened by screws 50 to bosses 51 of a crossmember 52 of the machine framework.

Specifically referring to Figures 3, 4 and 5, the anchorage member 33 has rearwardly pressed flanges 33b wherethrough the screws 50 pass to fasten the anchorage member to the bosses 51. By reason of clearance notches 28a in the retainer plate 28, the latter is not clamped fast by the screws 50 but is readily detachable from the machine by mere removal of the screws 32a.

The forward ends 17 of the spring coils 11 are each equipped with the aforestated attaching elements or clips 20 in the manner stated in reference to Figures 2, 3 and 4 and, by the loops or bights formed by the keyholes 30, are connected to projecting ends of the pins 44. More specifically, as shown in detail in Figure 8, said loops are drawn into circumferential grooves 44a provided in the pin 44. It will be noted that the clip 20 is slipped onto the pin at the widest place of the keyhole space 30, and that thereupon the spring is allowed to draw the clip to seat it at the narrow portion of the keyhole space into the said pin groove 44a. The clip 20 so seated and under the tension of the distended spring coil 11 retains the type action link 42 from slipping off the connecting pin 44.

Having particular reference to Figures 6 and 7 it is preferred to install the multiple spring assembly unit comprising the springs 10 on the anchorage member 33 as a complete unit in the machine and then, by means of a spring hook, indicated at 53, to connect or button to the pins 44 the various spring attaching elements 20 by drawing them forwardly one by one, and slipping them onto the ends of the pins 44. In Figure 7, a number of springs 10 at the left have been attached by their members 20 to the pins 44. One is shown drawn forwardly by a spring hook 53 and in the process of being hooked onto the pin. A number of springs on the right are shown to extend freely from the anchorage and ready for connection to the pins 44, and it may be seen that these springs stand erect, in orderly relation from the anchorage member and that the attaching elements 20 are susceptible of being picked up for connection without confusion and delay. It will further be noted from Figure 7 that the elements 20 stand substantially straight from the spring coils 11 and that the nature of the elements 20 is such that they are not liable to get entangled with each other.

Should it be necessary to replace one or more springs 10, due to breakage or fatigue, such springs can be easily removed after detachment of the retainer plate 28, the latter being restored and refastened after replacement of the faulty springs.

Variations may be resorted to within the scope of the invention and portions of improvements may be used without others.

Having thus described my invention, I claim:

1. A spring coil having at one end an anchorage shoulder formed by a few end coils of larger diameter adjoining smaller diameter coils, and a separate terminal element on the other end of the spring coil to render this end of the coil operatively attachable to a machine member, said element comprising, two substantially parallel, coextensive legs joined at one end and inserted at their extending ends into said other end of the spring coil, each leg having at least one tooth pointed transversely of the legs outwardly from the element, and said teeth by spreading of the legs entering from within the spring coil transversely thereof between the spring turns.

2. The invention set forth in claim 1, said element including a closed loop to button it to a machine element.

3. A unit assembly of a row of closely adjacent contractile springs reaching out from a common anchorage member in orderly, closely neighboring relations, said springs comprising each an elongate spring coil having near one end thereof a neck formed by a series of small-diameter spring turns, and including also larger-diameter spring turns at each end of the neck, said anchorage member comprising an elongate plate having along an edge thereof a row of spaced teeth forming therebetween notches extending into the plate transversely of its length to a depth substantially not less than the diameter of the said small-diameter spring turns, said spring coils associated with said plate in the notches thereof and the necks dimensioned relatively to the notches for a clasping hold of the spring turns in the notches of the plate to cause said spring coils to stand in orderly neighboring relations from the plate, said spring coils at their ends which stand from the plate being abruptly ending and having non-tangling terminal clips axially extending therefrom and comprising each a pair of parallel, coextensive legs, and a bridge integral with and connecting said legs, the legs at their extending ends having each a tooth biting outwardly between the end turns of the related spring coil, and each of said terminal clips extending from its spring coil lengthwise therefrom and having at its bridge an internal clearance for attaching it to a moving part of a machine.

4. In a typewriting machine, a series of type action elements movable in closely adjacent planes to operated positions, a short stud projecting from each such element transversely of its plane of operation, a second type action element pivotally associated with each one of said studs for operation of one associated element by the other, said studs having each a circumferential groove at an end thereof which extends beyond the second type action element, individual contractile spring coil means connectable to the individual studs to bias said type action elements toward normal positions, each said spring coil means comprising an elongate spring coil having next to one end thereof a neck formed by a few small-diameter spring turns intermediate larger-diameter spring turns, and an elongate anchorage plate common to all said spring coils and having teeth along an edge thereof forming spaced notches extending transversely into the plate, said spring coils anchored in said notches to extend from the anchorage plate by insertion of their necks transversely to their expanse into said notches, the necks of said spring coils dimensioned relatively to said notches for a clasping hold of the spring turns at said notches on the anchorage plate keeping said spring coils orderly extending from the plate before the spring coil means are connected to the said pins, each of said spring means comprising a terminal clip reaching from within the end of the spring coil lengthwise therefrom, and each said terminal clip comprising two substantially parallel, coextensive legs joined at corresponding ends by a bridge which with the legs comprise a flat stamping, the extending ends of said legs having projecting teeth for anchorage in between the turns from within the extending ends of the spring coils, and the remainder of each terminal clip extending straight from its spring coil and having at its bridge an internal clearance for buttoning the clip under distended condition of its spring coil to one of the pins by seating it in the groove therein, each terminal clip under the tension of its spring coil keeping the related type action elements operatively linked together and concomitantly also biasing such elements toward normal positions.

5. A spring assembly unit comprising a row of closely adjacent contractile spring coils extending from an elongate anchorage plate which is common to said spring coils, said spring coils having each near an anchorage end thereof a neck formed by a series of small-diameter spring turns adjoined by larger-diameter spring turns, said anchorage plate having along an edge thereof a row of teeth which form open notches extending into the plate transversely of its length to a depth substantially not less than the diameter of the small-diameter spring turns, each of said spring coils attached to said anchorage plate by its neck in one of the notches to stand substantially erect from the said plate, the necks of said spring coils dimensioned relatively to said notches to have a clasping hold at said notches on said anchorage plate.

6. A spring assembly unit for use with a system of type actions, comprising a row of closely adjacent contractile spring coils extending from an elongate anchorage plate which is common to said spring coils, said spring coils having each near an anchorage end thereof a neck formed by a series of small-diameter spring turns adjoined by larger-diameter spring turns, said anchorage plate having along an edge thereof a row of teeth which form open notches extending into the plate transversely of its length to a depth substantially not less than the diameter of the small-diameter spring turns, each of said spring coils attached to said anchorage plate by its neck in one of the notches to stand substantially erect from the said plate, the necks of said spring coils dimensioned relatively to said notches to have a clasping hold at said notches on said anchorage plate, each of said spring coils having at the end opposite to its neck a means to connect it with a part of a type action.

7. A spring assembly unit comprising a row of closely adjacent contractile spring coils extending from an elongate anchorage plate which is common to said spring coils, said spring coils having each near an anchorage end thereof a flexibly distensible neck formed by a series of small-diameter spring turns adjoined by larger-diameter spring turns, said anchorage plate having along an edge thereof a row of teeth which form open notches extending into the plate transversely of its length to a depth substantially not less than the diameter of the small-diameter spring turns, said notches wide enough to accommodate the size of the small-diameter spring turns but being narrower than the adjoining larger-diameter spring turns, each spring neck in its free state being of less length than the thickness of the plate at said notches, said necks of said spring coils lying transversely of said plate in said notches and the large-diameter coils immediately adjoining the necks, by reason of the neck being flexibly distensible, having a clasping action oppositely against said plate to hold said spring standing from the plate in closely neighboring and orderly relations.

8. A spring assembly unit comprising a row of closely adjacent contractile spring coils extending from an elongate anchorage plate, said spring coils having each near an anchorage end thereof a flexibly distensible neck formed by a series of small-diameter spring turns adjoined by larger-diameter spring turns, said anchorage plate having along an edge thereof a row of teeth which form open notches extending into the plate transversely of its length to a depth in excess of the size of the small-diameter spring turns, said notches wide enough to accommodate the size of the small-diameter spring turns but being narrower than the adjoining larger-diameter spring turns, the said spring coils having their necks lying transversely of said plate in said notches and the adjoining larger-diameter turns facing the teeth from opposite sides of the plate, said teeth having outer ends projecting transversely of the plate beyond the major plane of the teeth and cooperative with larger-diameter turns adjoining said necks to prevent said necks from slipping out of the notches, said spring coil necks placed in position in said notches by a temporary distention thereof in order to allow the larger-diameter coils to move into position past said projecting outer ends of the teeth, wherefore any spring coil on the plate is resiliently held from slipping off the projecting ends of the plate teeth.

9. A coil spring assembly comprising a distensible spring coil and a terminal element associated with the said coil, said element comprising, two generally parallel legs extending into one end of the spring coil, bridge means connecting said legs beyond said spring coil, and means to attach the element to a part of a machine, the said two legs having pointed tooth means diametrically opposite within the spring coil pointing therein outwardly on a bias toward the bridge means, said element when associated with the spring coil being in a flexed state for its legs to press the tooth means oppositely for a biting hold between turns of the spring coil, at least one of said legs having a shoulder facing the tooth means thereon at a location a short distance nearer to the bridge means than the tooth means, said legs within said spring coil beyond the said tooth means tapering toward one another in a direction from the bridge means and to an extent to facilitate association of the element with the spring coil by pushing the unflexed element leg-ends leading into said spring coil end, the tapering legs in such operation contacting the interior of the spring coil and flexing the legs toward one another by camming action, the said shoulder by contacting the end of the spring coil limiting the extent to which said element is pushable into the spring coil end.

10. A coil spring assembly comprising a distensible spring coil and a terminal element associated with the said coil, said element comprising, two generally parallel legs extending into one end of the spring coil, and a bridge means connecting said legs beyond said spring coil and including a bight to attach the element to a part of a machine, the said two legs having pointed tooth means diametrically opposite within the spring coil pointing therein outwardly on a bias toward the bridge means, said element when associated with the spring coil being in a flexed state for its legs to press the tooth means oppositely for a biting hold between turns of the spring coil, at least one of said legs having a shoulder facing the tooth means thereon at a location a short distance nearer to the bridge means than the tooth means, said legs within said spring coil beyond the said tooth means tapering toward one another in a direction from the bridge means and to an extent to facilitate association of the element with the spring coil by pushing the unflexed element leg-ends leading into said spring coil end, the tapering legs in such operation contacting the interior of the spring coil and flexing the legs toward one another by camming action, the said shoulder by contacting the end of the spring coil limiting the extent to which said element is pushable into the spring coil end.

References Cited in the file of this patent

UNITED STATES PATENTS

| Number | Name | Date |
|---|---|---|
| 469,982 | Scheuer | Mar. 1, 1892 |
| 1,248,671 | Kelly | Dec. 4, 1917 |
| 1,271,462 | Hansen | July 2, 1918 |
| 1,336,383 | Shimizu | Apr. 6, 1920 |
| 1,437,329 | Wilburger | Nov. 28, 1922 |
| 1,757,437 | Muldoon | May 6, 1930 |
| 2,035,816 | Lagaard | Mar. 31, 1936 |
| 2,043,303 | Ostdiek | June 9, 1936 |
| 2,169,708 | O'Callaghan | Aug. 15, 1939 |
| 2,178,689 | Helmond | Nov. 7, 1939 |
| 2,531,911 | Johnson | Nov. 28, 1950 |
| 2,567,508 | Carson | Sept. 11, 1951 |
| 2,568,390 | Gehrke | Sept. 18, 1951 |